US010091674B2

(12) United States Patent
Kim

(10) Patent No.: US 10,091,674 B2
(45) Date of Patent: Oct. 2, 2018

(54) LOCATION DETERMINATION METHOD AND LOCATION DETERMINATION SYSTEM FOR SENSOR APPARATUS PLACEMENTS IN BUILDING

(71) Applicant: EWHA UNIVERSITY-INDUSTRY COLLABORATION FOUNDATION, Seoul (KR)

(72) Inventor: Jeong-Ho Kim, Goyang-si (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 15 days.

(21) Appl. No.: 14/655,369

(22) PCT Filed: Dec. 15, 2014

(86) PCT No.: PCT/KR2014/012330
§ 371 (c)(1),
(2) Date: Jun. 25, 2015

(87) PCT Pub. No.: WO2016/039507
PCT Pub. Date: Mar. 17, 2016

(65) Prior Publication Data
US 2016/0262032 A1  Sep. 8, 2016

(30) Foreign Application Priority Data

Sep. 11, 2014 (KR) .................. 10-2014-0120272
Oct. 13, 2014 (KR) .................. 10-2014-0137320

(51) Int. Cl.
*H04W 24/06* (2009.01)
*H04L 12/28* (2006.01)
(Continued)

(52) U.S. Cl.
CPC ............... *H04W 24/06* (2013.01); *G01S 5/00* (2013.01); *H04L 12/28* (2013.01); *H04L 43/50* (2013.01);
(Continued)

(58) Field of Classification Search
CPC ...................................... H04W 24/06
See application file for complete search history.

(56) References Cited

U.S. PATENT DOCUMENTS

2006/0126437 A1* 6/2006 Smith ................... H04J 3/0667
368/46
2007/0008117 A1* 1/2007 Parker .................. G08B 25/003
340/539.21
(Continued)

FOREIGN PATENT DOCUMENTS

KR  10-2004-0106541 A  12/2004
KR  10-2005-0102087 A  10/2005

OTHER PUBLICATIONS

Korean Office Action in correspondence to Korean Patent Application No. KR10-2014-0120272.

*Primary Examiner* — John D Blanton
(74) *Attorney, Agent, or Firm* — Paratus Law Group, PLLC

(57) ABSTRACT

A location determining method 200 for sensor apparatus placements in building includes: a step in which a first measuring device transmits a digitally modulated first test packet through a specific channel at a first location in a building (210); a step in which a second measuring device receives the first test packet and transmits a first echo back signal through the specific channel at a second location in the building (220); a step in which the first measuring device receives the first echo back signal transmitted from the second measuring device and measures a first channel quality of the specific channel based on the first echo back
(Continued)

signal (230); a step in which the first measuring device transmits a digitally modulated second test packet through the specific channel (240); a step in which the second measuring device receives the second test packet and transmits a second echo back signal through the specific channel (250); and a step in which the first measuring device receives the second echo back signal transmitted from the second measuring device and measures a second channel quality of the specific channel based on the second echo back signal (260).

12 Claims, 4 Drawing Sheets

(51) Int. Cl.
*G01S 5/00* (2006.01)
*H04L 12/26* (2006.01)

(52) U.S. Cl.
CPC ...... *H04L 43/0847* (2013.01); *H04L 43/0894* (2013.01); *H04L 43/10* (2013.01)

(56) References Cited

U.S. PATENT DOCUMENTS

| | | | |
|---|---|---|---|
| 2007/0082677 A1* | 4/2007 | Donald Hart | H04W 16/18 455/456.1 |
| 2007/0162185 A1* | 7/2007 | McFarland | G01S 5/0289 700/258 |
| 2010/0061272 A1* | 3/2010 | Veillette | H04L 45/34 370/254 |
| 2013/0003591 A1* | 1/2013 | Novak | H04W 36/06 370/252 |
| 2016/0119850 A1* | 4/2016 | Kimura | H04W 36/30 370/332 |
| 2016/0292002 A1* | 10/2016 | Li | G06F 9/45558 |

* cited by examiner

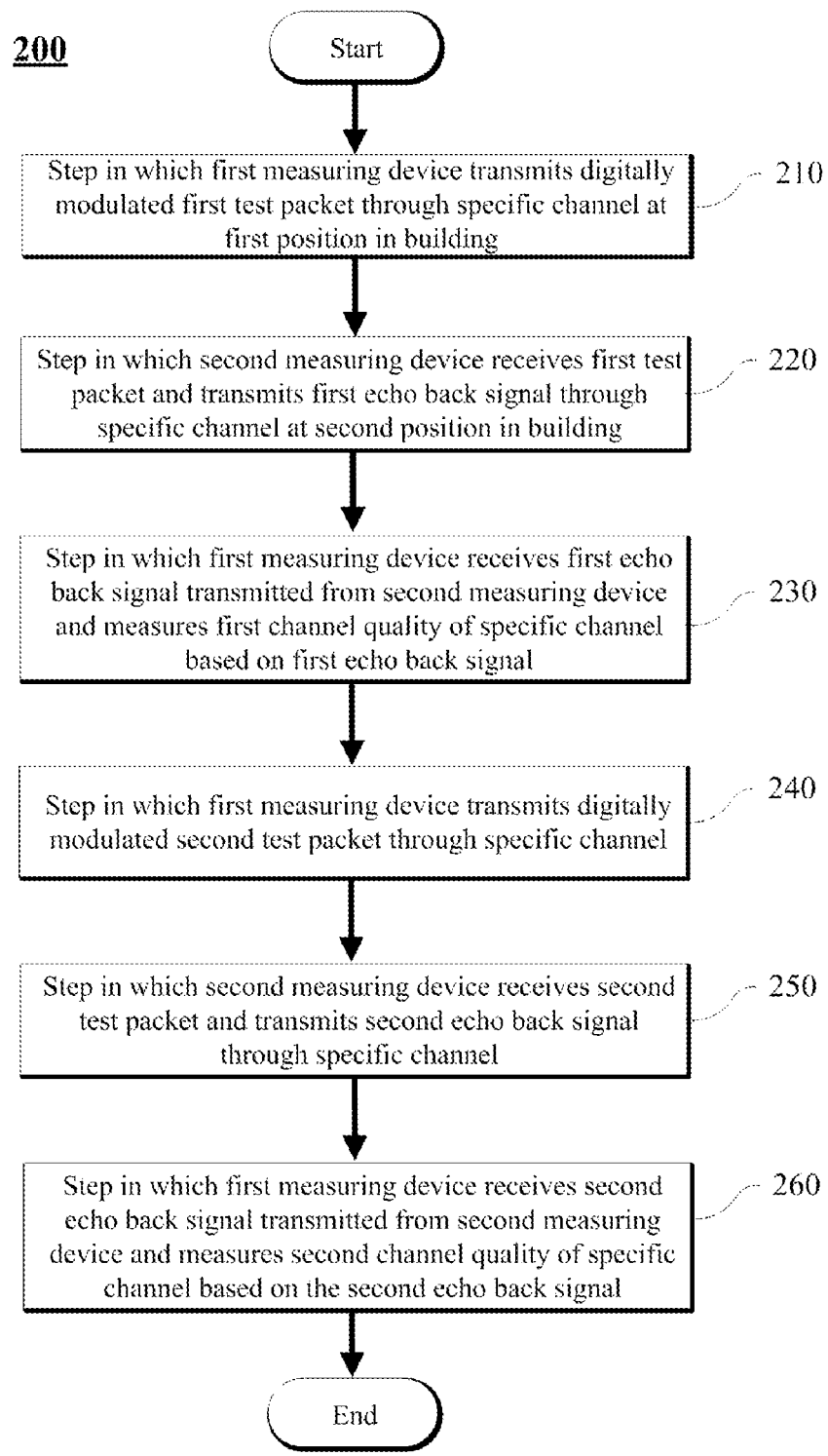

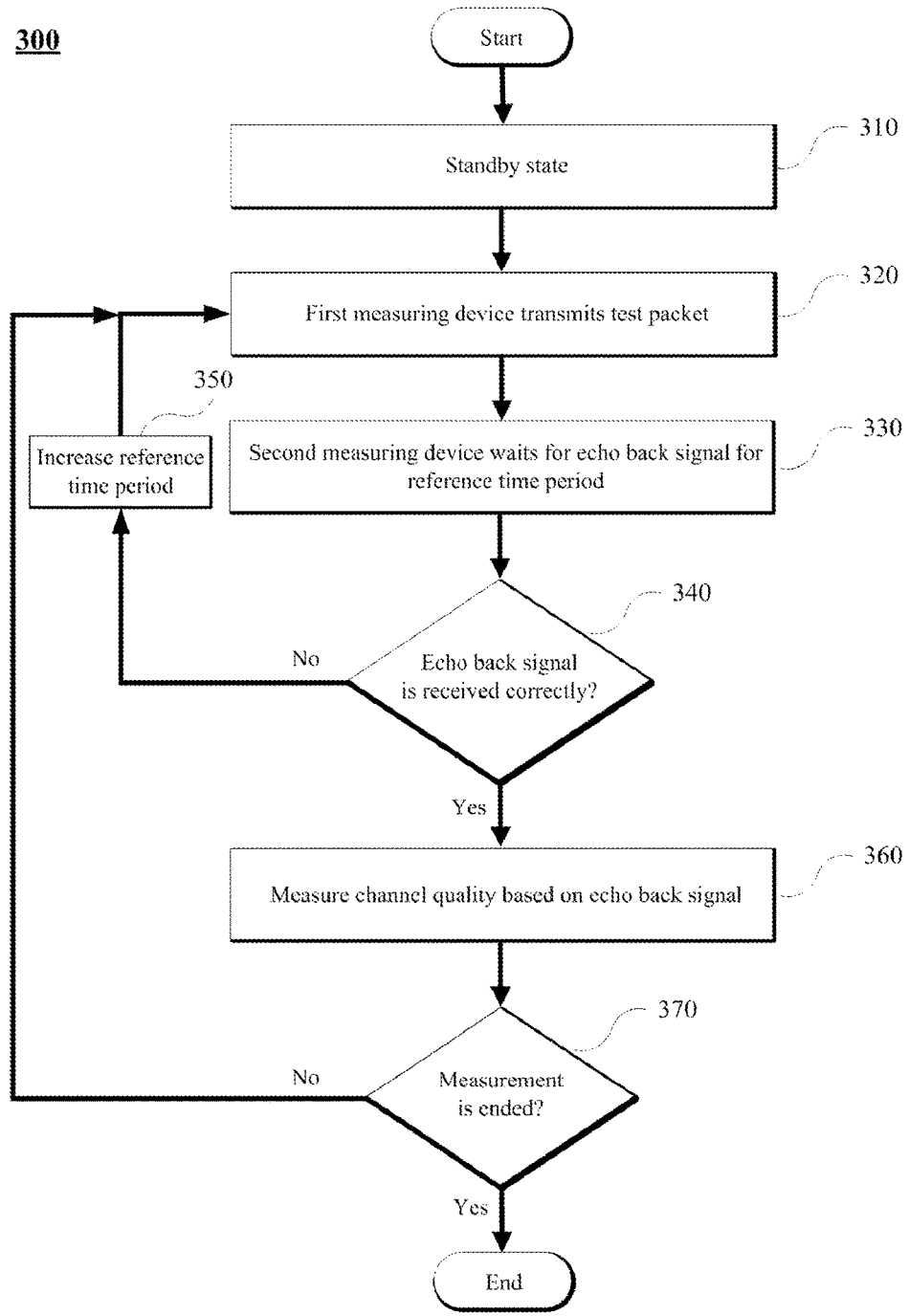

LOCATION DETERMINATION METHOD AND LOCATION DETERMINATION SYSTEM FOR SENSOR APPARATUS PLACEMENTS IN BUILDING

TECHNICAL FIELD

The following description relates to a technique for determining a location of a sensor placed in a building.

BACKGROUND ART

Recently, a smart building equipped with various sensors has become an issue. In a smart building, various sensors each obtaining certain information are used.

Generally, such a smart building is a large building, and many sensors are placed in a large inner space thereof. Therefore, considering the burden of cost caused by wiring, damage to a building and difficulty in design, in a smart building, a section where sensors are connected via wire is minimized and communication between sensors or between a sensor and an AP is wirelessly performed.

DISCLOSURE

Technical Problem

Generally, sensors are placed in a building according to experience of a builder or placed in a zone of a certain size. Actually, however, regardless of a distance between a transmitting device and a receiving device, signal transmission may not be carried out smoothly depending on an internal structure of a building.

The following description is directed to determining a placement location of a sensor by inspecting in advance whether or not communication is performed smoothly at a point where a sensor is placed within a building such as a smart building.

Technical Solution

A location determining method for sensor apparatus placement in a building includes: a step in which a first measuring device transmits a digitally modulated first test packet through a specific channel at a first location in a building; a step in which a second measuring device receives the first test packet and transmits a first echo back signal through the specific channel at a second location in the building; and a step in which the first measuring device receives the first echo back signal transmitted from the second measuring device and measures a first channel quality of the specific channel based on the first echo back signal.

The location determining method for sensor apparatus placement in a building further includes: a step in which the first measuring device transmits a digitally modulated second test packet through the specific channel; a step in which the second measuring device receives the second test packet and transmits a second echo back signal through the specific channel; and a step in which the first measuring device receives the second echo back signal transmitted from the second measuring device and measures a second channel quality of the specific channel based on the second echo back signal.

A location determining system for sensor apparatus placement in a building includes: a first measuring device which is located at a first location in a building and configured to transmit a digitally modulated first test packet through a specific channel, transmit a second test packet after receiving a first echo back signal, receive the first echo back signal and a second echo back signal from a second measuring device, and measure a channel quality of the specific channel; and the second measuring device which is located at a second location in the building and configured to receive the first test packet and the second test packet, and transmit the first echo back signal and the second echo back signal through the specific channel in response to the first test packet and the second test packet, respectively.

The first measuring device may measure a first channel quality based on at least one of a time period from when transmitting the first test packet to when receiving the first echo back signal, intensity of the first echo back signal, or a transmission rate of the first echo back signal.

The first measuring device may measure a second channel quality based on at least one of a time period from when transmitting the second test packet to when receiving the second echo back signal, intensity of the second echo back signal, or a transmission rate of the second echo back signal.

The second measuring device may measure a channel quality of the specific channel based on at least one of a time period from when transmitting the second echo back signal to when receiving the second test packet, intensity of the second test packet, or a transmission rate of the second test packet.

Advantageous Effects

The following description determines a placement location of a sensor by measuring in advance a communication quality in a certain channel before the sensor is placed in a building. Therefore, it is possible to find a sensor location, at which smooth communication is secured, and place the sensor in the building at an optimum cost.

DESCRIPTION OF DRAWINGS

FIG. 2 is a flow chart illustrating an example of a location determining method for sensor apparatus placement in a building.

FIG. 3 is a flow chart illustrating an example of an operation of a first measuring device that transmits a test packet.

BEST MODE

Figure 1A:
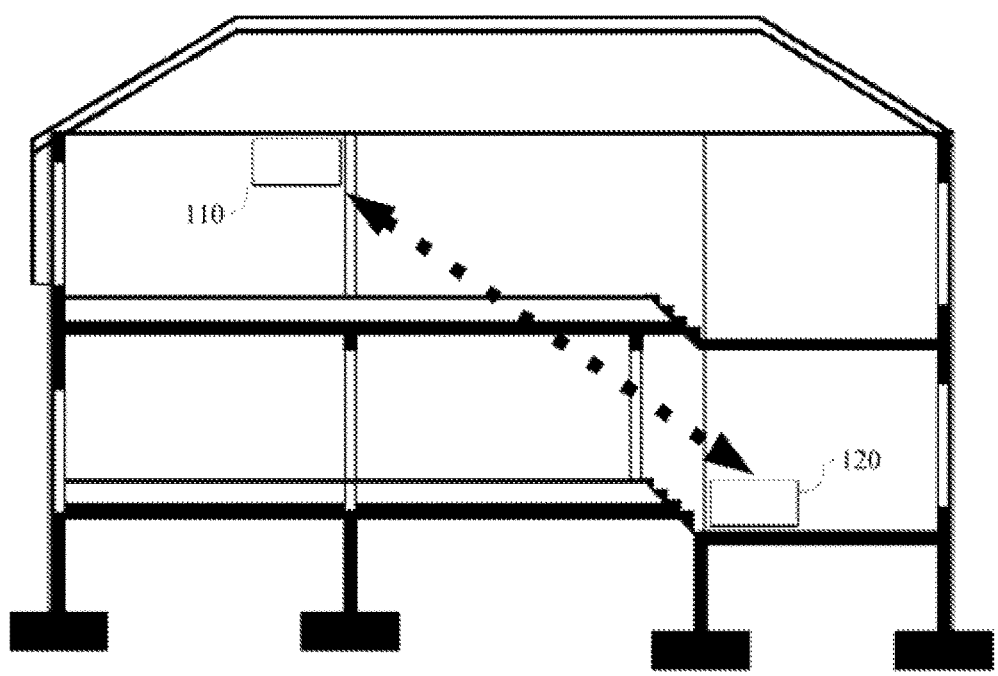
FIG. 1 is a block diagram illustrating an example of a configuration of a location determining system for sensor apparatus placements in building.

The present invention can be modified and changed in various ways and can be embodied in various forms, and thus, the present invention will now be described in detail with reference to the accompanying drawings, in which exemplary embodiments of the invention are illustrated. However, it should be noted that the present invention is not limited to the exemplary embodiments, but all modifications, equivalents, or substitutes within the spirit and scope of the present invention will be construed as being included in the present invention.

It will be understood that, although the terms "first", "second", "A", "B", and the like may be used herein in explaining various elements of the invention, such elements should not be limited by these terms, but are only used to distinguish one element from another. For example, a first element could be termed a second element, and similarly, a second element could be termed a first element, without departing from the scope of the present invention. As used herein, the term "and/or" includes any and all combinations of one or more of the associated listed items.

As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before describing the drawings in detail, it should be noted that the distinction of elements is for distinguishing the main function of each element. That is, two or more elements to be described below can be joined as one element, or an element can be functionally divided into two or more elements. Moreover, each element to be described below can perform not only its main function but also part or whole of the functions of other elements. Conversely, it is also possible that a part of the main functions pertained to each element can be fully performed by other elements. Therefore, the presence of each element described in the present specification should be functionally interpreted. For that reason, it shall be obvious that a configuration of the elements in accordance with a location determining system 100 for sensor apparatus placement in a building of the present invention may differ from one illustrated in the corresponding drawing, without departing from the spirit and technical scope of the present invention.

In addition, in performing a method or an operational method, each process constituting the method may be performed in an order different from a specified order as long as a specific order is not explicitly and contextually specified. That is, each process may be performed in the same order as the specified order, performed substantially simultaneously, or performed in reverse order.

Hereinafter, referring to the accompanying drawings, the location determining system 100 for sensor apparatus placement in a building and a location determining system 200 for sensor apparatus placement in a building will be described in detail.

As described above, a building includes therein various structures such as walls, doors, and stairs. Therefore, even if sensors are located within a communication distance, smooth communication cannot be secured.

An object of the present invention is to determine a location of a sensor device to be installed in a building. That is, before a sensor device is installed in a building, whether or not communication is performed smoothly between a point where a first measuring device to be described later is located and a point where a second measuring device to be described later is located is inspected in advance using the first measuring device and the second measuring device. Anyone who wants to verify a location determines an optimum location by varying the locations of the first measuring device and the second measuring device. Preferably, the measuring devices may be portable devices which can be carried by a person.

The first measuring device is configured to transmit a first signal for communication quality measurement, and the second measuring device is configured to receive the first signal and transmit an echo back signal. The first measuring device and the second measuring device may have the same hardware architecture, or may have different hardware architectures from each other.

The sensor device has the meaning including various devices, such as a temperature sensor, a humidity sensor, a light sensor, a motion sensor, and an image acquisition sensor, to be used in a smart building or the like.

FIG. 1 is a block diagram illustrating an example of a configuration of a location determining system 100 for sensor apparatus placement in a building.

FIG. 1(a) illustrates a first measuring device 110 and a second measuring device 120 for checking a communication status of a sensor device in a building, and illustrates a case where the first measuring device 110 is located at a wall surface on a second floor of the building and the second measuring device 120 is located at a floor surface on a first floor of the building. A location of the first measuring device 110 will be referred to as "first location" and a location of the second measuring device 120 will be referred to as "second location". Thus, whether or not communication is performed smoothly between the first location and the second location is inspected. If an operator determines that communication is performed smoothly between the first location and the second location, he/she may record these locations or store them in the measuring devices. Then, sensor devices may be respectively placed at the first location and the second location during sensor placement, or a sensor may be placed at one of the locations and an AP configured to receive a signal from the sensor may be placed at the other location.

The location determining system 100 for placement of sensor devices in a building includes: the first measuring device 110 which is located at the first location in the building and configured to transmit a digitally modulated test packet through a specific channel, receive an echo back signal from the second measuring device 120, and measure a channel quality of the specific channel; and the second measuring device 120 which is located at the second location in the building and configured to receive the test packet and transmit the echo back signal through the specific channel.

Figure 1B:
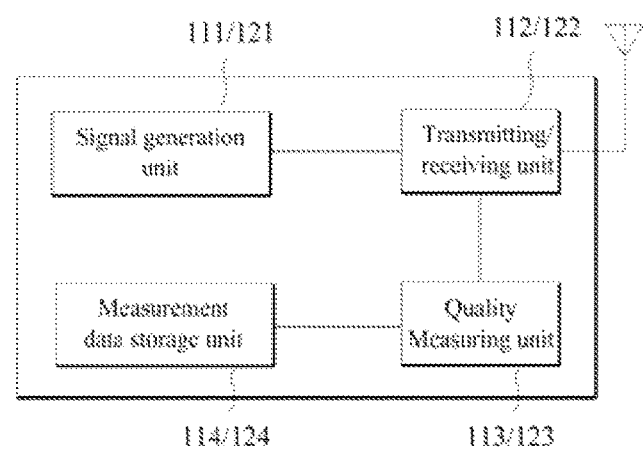

FIG. 1(b) is a block diagram example illustrating a configuration of the first measuring device 110 and the second measuring device 120, and illustrates an example where the first measuring device 110 and the second measuring device 120 have the same configuration.

A signal generation unit 111 of the first measuring device 110 is configured to generate a test packet for a test. The test packet includes a predetermined symbol. A digital modulation method for generating the test packet may use various methods. For example, PSK (Phase Shift Keying) or QAM (Quadurature Amplitude Modulation) may be used.

A transmitting/receiving unit 112 of the first measuring device 110 is configured to transmit the test packet and receive an echo back signal. A quality measuring unit 113 of the first measuring device 110 is configured to measure a quality based on the received echo back signal. Further, in quality measurement, not only a characteristic of the signal itself but also how long it takes the first measuring device 110 to receive the echo back signal after transmitting the test packet can be an important factor (time for signal transmission). A measurement data storage unit 114 of the first measuring device 110 is configured to store a quality condition of the channel used by the first measuring device 110.

A signal generation unit 121 of the second measuring device 120 is configured to generate the echo back signal. A transmitting/receiving unit 122 is configured to receive the test packet and transmit the echo back signal. A quality measuring unit 123 of the second measuring device 120 is configured to measure a quality condition of the channel based on the received test packet, and a measurement data storage unit 124 is configured to store the quality condition of the channel.

The first measuring device 110 may transmit a test packet several times. For example, in the case of transmitting a test packet two times, the first measuring device 110 transmits a first test packet and then receives a first echo back signal from the second measuring device 120 in response to the first test packet. The first measuring device 110 transmits a second test packet after receiving the first echo back signal and receives a second echo back signal from the second measuring device 120 in response to the second test packet. Through this process, the first measuring device 110 can measure a channel quality two times respectively using the first echo back signal and the second echo back signal. Further, the second measuring device 120 can also measure a channel quality using the received test packets.

FIG. 2 is a flow chart illustrating an example of a location determining method 200 for sensor apparatus placement in a building.

The location determining method 200 for sensor apparatus placement in a building includes: a step in which a first measuring device transmits a digitally modulated first test packet through a specific channel at a first location in a building (210); a step in which a second measuring device receives the first test packet and transmits a first echo back signal through the specific channel at a second location in the building (220); and a step in which the first measuring device receives the first echo back signal transmitted from the second measuring device and measures a first channel quality of the specific channel based on the first echo back signal (230).

The location determining method 200 for sensor apparatus placement in a building further includes: a step in which the first measuring device transmits a digitally modulated second test packet through the specific channel (240); a step in which the second measuring device receives the second test packet and transmits a second echo back signal through the specific channel (250); and a step in which the first measuring device receives the second echo back signal transmitted from the second measuring device and measures a second channel quality of the specific channel based on the second echo back signal (260). This is an example where the first measuring device transmits a test packet two times.

The first measuring device 110 can repeatedly transmit a test packet in a periodic or non-periodic manner so as to prepare multiple channel quality measurement results. Generally, a noise may be generated depending on a communication environment during signal transmission. Therefore, for accurate measurement, it is desirable to repeatedly perform measurement more than a certain number of times.

Hereinafter, operations of the first measuring device 110 and the second measuring device 120 will be described in detail.

FIG. 3 is a flow chart illustrating an example of an operation 300 of a first measuring device that transmits a test packet.

The first measuring device 110 is in an initial standby state (310), and if a user who will inspect a communication status between the first location and the second location transmits a first test packet using the first measuring device 110 (320), the measuring device 110 is operated. If the first measuring device transmits the test packet, the first measuring device waits for an echo back signal from the second measuring device 120 for a reference time period (330).

The first measuring device 110 determines whether or not the echo back signal is correctly received (340). If the echo back signal is not received by the reference time period, the first measuring device 110 regularly increases the first reference time period (350), and transmits the test packet again (320).

If the echo back signal is correctly received, the first measuring device 110 measures a channel quality based on the received echo back signal (360). Then, the first measuring device 110 determines whether or not channel quality measurement is ended (370). The measurement may be continued by repeatedly transmitting the test packet, or the measurement may be ended.

The channel quality measurement may be ended after determining whether or not the test packet is transmitted a predetermined number of times. Otherwise, if a channel quality is repeatedly measured and the measurement values are constant without a great difference, the measurement may be ended.

In the step 360, the first measuring device 110 may measure a channel quality based on at least one of a time period from when transmitting the test packet to when receiving the echo back signal, intensity of the echo back signal, or a transmission rate of the echo back signal.

The time period for receiving the echo back signal may be an accurate time period from when transmitting the test packet to when receiving the echo back signal. If the first measuring device 110 cannot receive the echo back signal by the reference time period and increases the reference time period, the time period for receiving the echo back signal may be a final reference time at which the echo back signal is successfully received.

The intensity of the echo back signal may be determined by analyzing a power value of the signal, and the data transmission rate of the echo back signal is a standard of how quickly the echo back signal is transmitted.

The first measuring device 110 receives a first echo back signal as a first echo back signal and measures a channel quality (a first channel quality) based on the first echo back signal. Then, the first measuring device 110 transmits a second test packet and measures a channel quality (a second channel quality) again based on a second echo back signal to be received in response to the second test packet. The user compares information of the first channel quality and information of the second channel quality. If the information is similar, it is recognized as available information, and the operation may be stopped. However, if the information of the measured first channel quality and information of the measured second channel quality have differences beyond a certain margin, preferably, the user performs the entire measurement process again.

The echo back signal transmitted from the second measuring device 120 may use a signal having a different symbol from that of the test packet, may use the same symbol as that of the test packet, or may return the received test packet as it is. If the echo back signal is the test packet transmitted from the first measuring device 110, the first measuring device 110 knows the contents of the test packet transmitted by itself, and, thus, it is possible to check a signal transmission rate and/or a signal transmission error rate.

Figure 4:
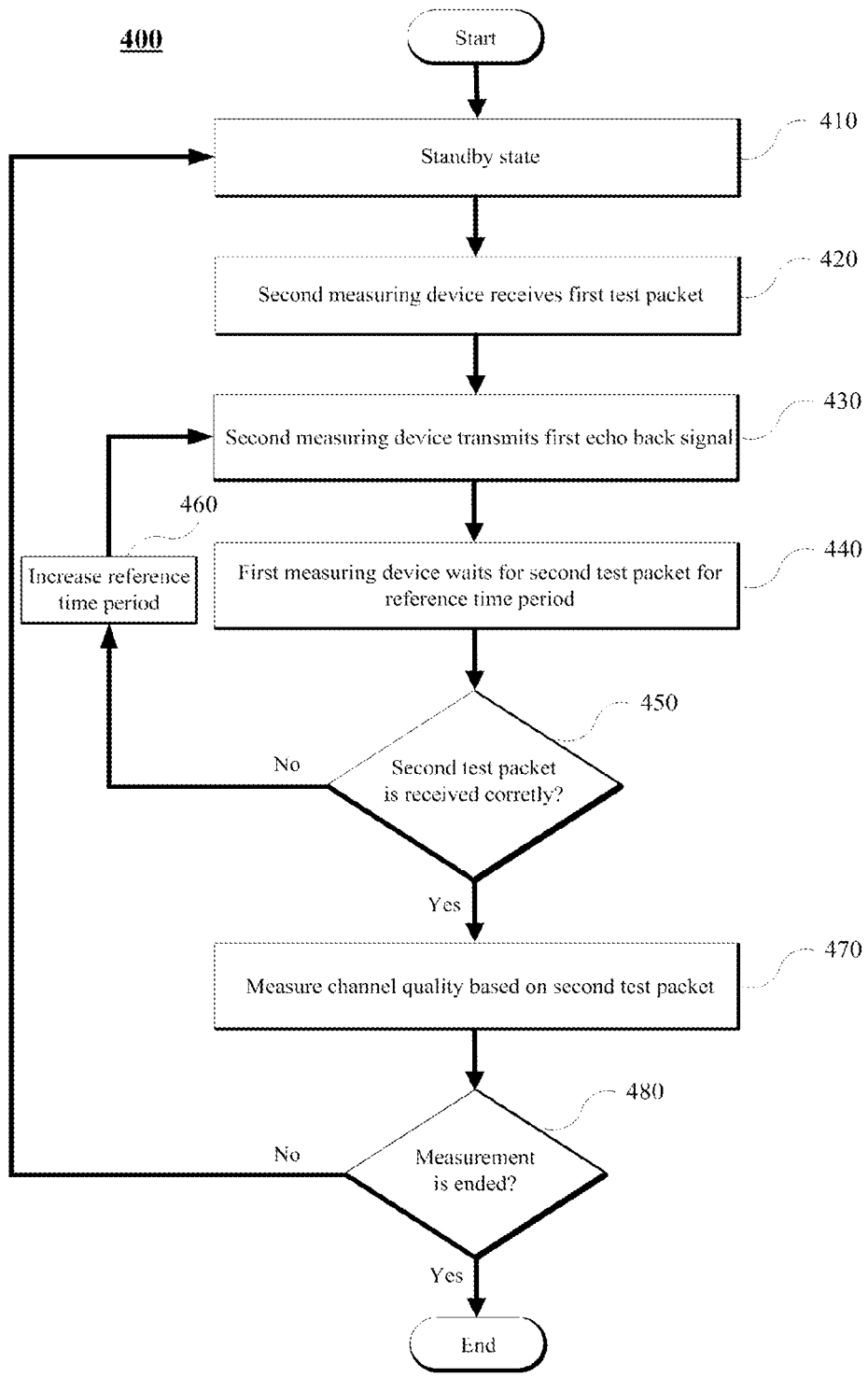
FIG. 4 is a flow chart illustrating an example of an operation of a second measuring device that transmits an echo back signal.

FIG. 4 is a flow chart illustrating an example of an operation 400 of a second measuring device that transmits an echo back signal.

The measuring device is in an initial standby state (410), and at the time of receiving a first test packet (420), the measuring device is operated as the second measuring device 120. The second measuring device 120 transmits a first echo back signal after receiving the test packet (430).

Then, the second measuring device 120 waits for a second test packet from the first measuring device 110 for a reference time period. If the second test packet is not received correctly by the reference time period, the second measuring device 120 increases the reference time period (standby time) and then transmits the first echo back signal again (430).

If the second test packet is received correctly by the reference time period, the second measuring device 120 measures a channel quality based on the received second test packet (470). Channel quality measurement is performed in the same manner as performed by the first measuring device 110.

Then, the second measuring device 120 determines whether or not the measurement is ended (480). If the measurement is not ended, the second measuring device 120 returns to the standby state for receiving the test packet (410).

Further, the first measuring device 110 and/or the second measuring device 120 may further include a display device that outputs information of the measured channel quality, and may transmit the measured channel quality to a separate central control server.

Also, the first measuring device 110 and/or the second measuring device 120 may compare the measured channel quality with a reference value and determine whether or not it is appropriate for placement of a sensor. The first measuring device 110 and/or the second measuring device 120 transmits and receives the test packet and the echo back signal at the first location where the first measuring device 110 is currently located and the second location where the second measuring device 120 is currently located, and if the measured channel quality is equal to or higher than the reference value (the channel quality is appropriate), the first location and the second location may be stored.

The locations within the building may be stored by the user by inputting specific location information, and a conventional technology (a method using a WiFi AP or the like) for finding a location within a building may be used.

The exemplary embodiments and the accompanied drawings of the present invention have been described for simply describing a part of the technical spirit of the present invention, and it is obvious that all modifications and specific embodiments easily conceivable by those skilled in the art within the scope of the technical spirit included in the specification and drawings of the present invention belong to the scope of the right of the present invention.

DESCRIPTION OF MAIN REFERENCE NUMERALS OF DRAWINGS

| | | | |
|---|---|---|---|
| 100: | Location determining system for sensor apparatus placement in building | | |
| 110: | First measuring device | 111: | Signal generation unit |
| 112: | Transmitting/receiving unit | 113: | Quality measuring unit |
| 114: | Measurement data storage unit | 120: | Second measuring device |
| 121: | Signal generation unit | 122: | Transmitting/receiving unit |
| 123: | Quality measuring unit | 124: | Measurement data storage unit |

The invention claimed is:

1. A location determining method for sensor apparatus placements in a building comprising:
    transmitting, by a first portable test device, a first test signal through a specific channel at a first location which is a current location of the first portable test device in the building and a potential location of a first sensor in the building;
    transmitting, by a second portable test device, a first echo back signal which transmits through the specific channel at a second location which a current location of the second portable test device in the building and is a potential location of a second sensor or an access point in the building if the first test signal is received;
    measuring, by the first portable test device, a first channel quality of the specific channel based on the first echo back signal;
    determining, by the first portable test device, a first candidate location of the first sensor based on the first location if the first channel quality is higher than a reference value;
    storing, by the first portable test device, the first candidate location;
    measuring, by the second portable test device, a second channel quality of the specific channel based on the first test signal or a second test signal from the first portable test device;
    determining, by the second portable test device, a second candidate location of the second sensor or the access point based on the second location if the second channel quality is higher than the reference value; and
    storing, by the second portable test device, the second candidate location,
    wherein the first location and the second location are inputted by a user or detected based on an indoor positioning technology.

2. The location determining method of claim 1, wherein the first test signal is modulated with PSK (Phase Shift Keying) or QAM (Quadurature Amplitude Modulation).

3. The location determining method of claim 1, wherein the first portable test device measures the first channel quality based on at least one of a time period from when transmitting the first test signal to when receiving the first echo back signal, intensity of the first echo back signal, or a transmission rate of the first echo back signal.

4. The location determining method of claim 1, further comprising:
    transmitting, by the first portable test device, the first test signal again if the first echo back signal is not received in a reference time period.

5. The location determining method of claim 1, further comprising:
    receiving, by the first portable test device, a second echo back signal through the specific channel from the second portable test device which transmits the second echo back signal if the second test signal is received; and
    measuring, by the first portable test device, a third channel quality of the specific channel based on the second echo back signal.

6. The location determining method of claim 5, wherein the first portable test device measures the third channel quality based on at least one of a time period from when transmitting the second test signal to when receiving the second echo back signal, an intensity of the second echo back signal, or a transmission rate of the second echo back signal.

7. A location determining system for sensor apparatus placements in a building comprising:
a first portable test device which is located at a first location which is a potential position of a first sensor in the building and configured to transmit a modulated first test signal through a specific channel, receive a first echo back signal from a second portable test device, measure a first channel quality of the specific channel based on the first echo back signal, determine a first candidate location of the first sensor based on the first location if the first channel quality of the specific channel is higher than a reference value, and store the first candidate location; and
the second portable test device which is located at a second location which is a potential position of a second sensor or an access point in the building and configured to transmit the first echo back signal through the specific channel if the first test signal is received, measure a second channel quality of the specific channel based on the first test signal or a second test signal from the first portable test device, determine a second candidate location of the second sensor or the access point based on the second location if the second channel quality of the specific channel is higher than the reference value, and store the second candidate location, wherein the first location and the second location are inputted by a user or detected based on an indoor positioning technology.

8. The location determining system of claim 7, wherein the first portable test device measures the channel quality based on at least one of a time period from when transmitting the first test signal to when receiving the first echo back signal, intensity of the first echo back signal, or a transmission rate of the first echo back signal.

9. The location determining system of claim 7, wherein the first echo back signal includes the first test signal received by the second portable test device.

10. The location determining system of claim 7, wherein the first portable test device further receives a second echo back signal from the second portable test device, and measures a third channel quality of the specific channel based on the second echo back signal.

11. The location determining system of claim 10, wherein the first portable test device measures the third channel quality based on at least one of a time period from when transmitting the second test signal to when receiving the second echo back signal, intensity of the second echo back signal, or a transmission rate of the second echo back signal.

12. The location determining system of claim 7, wherein the first test signal is modulated with PSK (Phase Shift Keying) or QAM (Quadurature Amplitude Modulation).

* * * * *